US006286016B1

(12) United States Patent
Heller et al.

(10) Patent No.: US 6,286,016 B1
(45) Date of Patent: Sep. 4, 2001

(54) INCREMENTAL HEAP EXPANSION IN A REAL-TIME GARBAGE COLLECTOR

(75) Inventors: Steve Heller, Chelmsford; Christine H. Flood, Burlington, both of MA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/094,035

(22) Filed: Jun. 9, 1998

(51) Int. Cl.$^7$ .................................................. G06F 17/30

(52) U.S. Cl. ......................................... 707/206; 711/170

(58) Field of Search ........................... 707/206; 711/170, 711/171, 172

(56) References Cited

U.S. PATENT DOCUMENTS

| | | | |
|---|---|---|---|
| 5,025,367 | * 6/1991 | Gurd et al. | 707/206 |
| 5,321,834 | * 6/1994 | Weiser et al. | 707/206 |
| 5,640,529 | * 6/1997 | Hasbun | 711/103 |
| 5,930,807 | * 6/1999 | Ebrahim et al. | 707/206 |
| 5,987,580 | * 11/1999 | Jasuja et al. | 711/170 |

OTHER PUBLICATIONS

Henry G. Baker, Jr., "The Treadmill: Real–Time Garbage Collection Without Motion Sickness," 8398 ACM Sigplan Notices, vol. 27, No. 3 (Mar. 1992), pp. 67–70.

Paul R. Wilson, "Uniprocessor Garbage Collection Techniques," BNSDOCID: XP 2115784A, University of Texas, pp. 1–42.

M.L. Minsky, "A LISP Garbage Collector Algorithm Using Serial Secondary Storage," Massachusetts Institute of Technology, Project MAC, Cambridge, Massachusetts, Artificial Intelligence Project, Memo 58 (Revised), Memorandum MAC–M–129, (Dec. 27, 1963), pp. 1–4.

Robert R. Fenichel et al., "A LISP Garbage–Collector for Virtual–Memory Computer System," Massachusetts Institute of Technology, Communications of the ACM, vol. 12, No. 11, (Nov. 1969), pp. 611–612.

David A. Moon, "Garbage Collection in a Large Lisp Systems," Symbolics, Inc., Cambridge, Mass., 1984 ACM 0–89791–142–3/84/008/0235, pp. 235–246.

Jacques Cohen, "Garbage Collection of Linked Data Structures," Department of Physics, Brandeis University, Waltham, Massachusetts, Computing Surveys, vol. 13, No. 3, (Sep. 1981), pp. 341–367.

Henry G. Baker, Jr., "List Processing In Real Time on a Serial Computer," Massachusetts Institute of Technology, Communications of the AMC, 21, 4, (Apr. 1978), pp. 1–13.

(List continued on next page.)

*Primary Examiner*—Hosain T. Alam
*Assistant Examiner*—Jean Bolte Fleurantin
(74) *Attorney, Agent, or Firm*—Finnegan, Henderson, Farabow, Garrett & Dunner, L.L.P.

(57) ABSTRACT

A system that performs real-time garbage collection by dynamically expanding and contracting the heap is provided. This system performs real-time garbage collection in that the system guarantees garbage collection will not take more time than expected. The system dynamically expands and contracts the heap to correspond to the actual memory space used by live objects. This dynamic resizing of the heap has the advantages of expanding when the amount of objects increases and contracting to free memory space for use by other procedures when the amount of objects decreases. Keeping the heap as small as possible frees resources for other processes and increases the locality of reference for the application. This dynamic resizing also ensures that the new memory space will not run out of memory before all of the live objects from the old memory space are copied, even if all of the live objects in the old memory space survive.

24 Claims, 6 Drawing Sheets

OTHER PUBLICATIONS

Wilson, P.R., et al., "Design of the Opportunistic Garbage Collector," Proceedings of the Object Oriented Programming Systems Languages An Applications Conference, New Orleans, vol. 24, No. 10, Oct. 1989.

Jones et al., "Garbage Collection: Algorithms for automatic dynamic memory management," John Wiley & Sons, pp. 165–175.

MIT Scheme Reference, 11.5: Object Hashing, updated Oct. 27, 1994.

MIT Scheme Reference, 11.4.4: Address Hashing, updated Oct. 27, 1994.

* cited by examiner

INCREMENTAL HEAP EXPANSION IN A REAL-TIME GARBAGE COLLECTOR

BACKGROUND

A. Field of the Invention

The present invention relates to data processing systems and, more particularly, to dynamically expanding and contracting the heap in a real-time data processing system with automatic memory management garbage collection.

B. Description of the Related Art

The performance of computer systems depends in large part on the efficiency of their memory management. For example, the manner in which memory is allocated and deallocated to a procedure in a computer system can significantly affect the overall performance of the system. Computer programs typically comprise a number of procedures containing instructions for performing a discrete unit of functionality. It is common for many programs to run on a computer system, with each program containing many procedures. Thus if memory allocation and deallocation occurs inefficiently, the overall performance of the system can be greatly affected. Likewise, efficient memory allocation and deallocation can greatly improve the overall performance of the system.

Many computer programs are object oriented and perform their processing by using a number of objects. An "object" is a combination of data and behavior, and at some point during an object's lifetime, the object typically is created in memory and resides in the "heap," the memory space used by an active procedure. When an object resides in the heap, it may be referenced by using a pointer. A "pointer" is a relatively small amount of information, such as a memory address, that is used to access the object. Objects may internally use pointers to refer to other objects. Sometimes, an object becomes unreachable and can no longer be accessed either directly or indirectly. Objects can become unreachable, for example, when a procedure completes and the object is no longer used or when a referencing object's pointer to the object is overwritten. If an object becomes unreachable, the object is needlessly occupying memory and is thus considered to be "garbage" (a "garbage object"). In such circumstances, the memory this object occupies can be reclaimed by the system so that it can be reused. The phrase "garbage collection" refers to automatic memory management strategies involving the identification or removal of unreachable objects and the reclamation of the memory space occupied by the unreachable objects.

As part of their memory management scheme, some garbage collection strategies relocate "live" objects, objects still reachable by the executing procedure. As shown in FIG. 1, some of these garbage collection strategies, referred to as copying garbage collectors, generally copy the live objects 100 from one memory space, the old memory space 102, to another memory space, the new memory space 104, leaving behind the garbage objects 106 and updating all references to relocated objects. Thereafter, the old memory space 102 from which the objects were copied will contain only garbage objects and can be reused because all live objects have been removed. During the running of a procedure, some of the live objects in the new memory space 104 eventually become unreachable and become garbage. And as new, live objects are allocated, the new memory space fills up. When the now memory space 104 fills, the process repeats itself by copying, only the new live objects 108 and the live objects 100 that have not become unreachable in the new memory space back to the old memory space 102, thus leaving behind any garbage objects contained in the new space. Copying is a time-efficient garbage collection strategy because it avoids searching for and selectively removing garbage from the memory space.

During execution of a procedure, copying garbage collectors copy the live objects from the old memory space to the new memory space, by first copying the root set of the procedure. The "root set" of a procedure is an object that is the origination point from which all reachable objects of the procedure can be traced. The root set also contains global variables, local variables, and registers used by the procedures. If an object is not reachable from the root set either directly or indirectly (through a path of pointers), the object is unreachable and hence garbage.

Once the root set has been copied, each live object will be scanned. When an object is "scanned," all objects to which it directly refers are copied from the old memory space to the new memory space, and pointers in that object are updated to point to the newly relocated position. For instance, the scanning of the root set will copy all of the objects directly pointed to by the root set. This process, known as "transitive closure", copies all objects pointed to by the root set, all objects pointed to by them, etc. When all of the objects in the heap are copied and scanned, all live objects will have been copied over from the old space into the new space and all references updated. Consequently, all of the garbage will be left behind in the old space. A more complete description of copying garbage collectors, scanning, and other garbage collection aspects can be found in Wilson, *Uniprocessor Garbage Collection Techniques,* University of Texas, Lecture notes in Computer Science, International Workshop on Memory Management, September 1992, which is hereby incorporated by reference.

One important aspect associated with some procedures is, they must have a bound on the maximum amount of time they can use. These procedures have real-time requirements, meaning the amount of processing time must be predictable and typically short. For example, real-time procedures are very useful for data processing applications demanding a rapid and reliable processing speed for transmission of video or voice signals. For such real-time procedures, real-time garbage collection strategies have been developed. In real-time garbage collection strategies, the procedure can rely on garbage collection-related processing not exceeding a maximum amount of time and not imposing an unexpectedly large time burden on the system. As such, in a real-time garbage collector, the maximum amount of time that can be consumed by the garbage collector for its processing is known even in the worst case scenario.

Henry Baker published a garbage collection strategy for real-time garbage collection in a 1978 paper, Baker, *List Processing in Real Time on a Serial Computer,* M.I.T. C.A.C.M. 21, 4 (4/78), 280–294, 1978, which is hereby incorporated by reference. For a summary of this strategy, see also Richard Jones and Rafael Lins, *Garbage Collection: Algorithms for Automatic Dynamic Memory Management,* John Wiley & Sons, 1996, which is also incorporated herein by reference. Baker's strategy operates in a similar manner to the copying garbage collectors discussed above, scanning in the objects from the old memory space to the new memory space. However, this scanning is performed incrementally and interleaved with allocation of new objects into the new memory space, so that, in most cases, it can be ensured that all live objects are copied and all pointers updated before the new memory space is filled. For every new object put into the new memory space, a predetermined number of live objects are scanned. As before, all garbage is left behind in the old memory space, and the old memory space will be free for use when the process reverses to copy live objects from the new memory space back to the old memory space.

Although Baker's algorithm was an advance over then-existing garbage collection strategies with respect to real-time systems, it was developed during a time when computers had a small amount of memory, which may pose a problem: if the amount of memory space in use overflows, the procedure aborts. Another limitation of Baker's strategy is, if more than the expected fraction of objects survive from the old memory space to the new memory space, there may not be enough space remaining for allocation of new objects. In this situation, since copying is interleaved with allocation, the new memory space will run out of space before all the live objects are copied and updated, causing the system to fail. As a result of the above described limitations, it is desirable to improve garbage collection strategies.

SUMMARY OF THE INVENTION

This disclosure describes a system that performs real-time garbage collection by dynamically expanding and contracting the heap. This system performs real-time garbage collection in that the system guarantees that pauses of the user's procedure taken for garbage collection will not take more than a short and expected amount of time. The system dynamically expands and contracts the heap to correspond to the actual memory space used by live objects. This dynamic resizing of the heap has the advantages of expanding when the amount of objects increases and contracting to free memory space for use by other procedures when the amount of objects decreases. Keeping the heap as small as possible frees resources for other processes and increases the locality of reference for the application. This dynamic resizing also ensures that the new memory space will not run out of memory before all of the live objects from the old memory space are copied and updated, even if all of the live objects in the old memory space survive. Furthermore, the system implements a time and space tradeoff that allows the garbage collector to trade garbage collection work time for memory space, or vice versa, depending on the system's requirements.

In accordance with methods consistent with the present invention, as embodied and broadly described herein, a method for performing garbage collection in a data processing system having memory spaces is provided. A first of the memory spaces contains reachable and unreachable objects. This method determines a size for a second of memory spaces, where the size is large enough to store the objects from the first memory space and new objects to be allocated, allocates the second memory space such that the size of the second memory space is the determined size, and copies the reachable objects from the first memory space into the second memory space leaving the unreachable objects in the first memory space.

BRIEF DESCRIPTION OF THE DRAWINGS

The accompanying drawings, which are incorporated in and constitute a part of this specification, illustrate an embodiment of the invention and, together with the description, serve to explain the advantages and principles of the invention. In the drawings.

DETAILED DESCRIPTION

Systems and methods consistent with the present invention perform garbage collection using dynamically resizable memory spaces. In doing so, these systems and methods expand and contract the heap while maintaining real-time behavior. This expansion and contraction of the heap allows the heap to closely reflect the actual size of the live objects, making more space when necessary and reducing space when possible. The heap expands to accommodate new objects and hence avoids running out of space. Similarly, the heap shrinks when possible to more accurately reflect the amount of space actually consumed by live objects thus using memory more efficiently than in conventional systems.

Another aspect of systems and methods consistent with the present invention is that they perform real-time garbage collection, thus guaranteeing a bound on the maximum time used during garbage collection. Moreover, the administrator may configure the garbage collection system either to use less time or less memory space. The amount of scanning work performed by the garbage collector is inversely linked to the amount of new memory space allocated for live objects. Thus, the administrator can reduce the amount of time necessary for performing garbage collection by increasing the amount of memory available for new objects, or the administrator can conserve memory by reducing the amount of memory available for new objects, which increases the amount of time necessary for performing garbage collection.

Overview

The garbage collection process consistent with the present invention repetitively performs two steps: it allocates a new memory space, and it relocates live objects from the old memory space to the new memory space. Given a memory space with objects, this garbage collection process allocates a new memory space with the size of the new memory space being based on the objects in the pre-existing memory space. After allocating the new memory space, the garbage collection process relocates the live objects from the old memory space into the new memory space at the same time that new objects are allocated into the new memory space. The garbage collection process performs scanning work in proportion to the ratio of the space allocated for new objects in the new memory space and the space reserved for surviving objects and hence, ensures that the new memory space will not become filled before all the live objects have been relocated from the old memory space.

Figure 1:
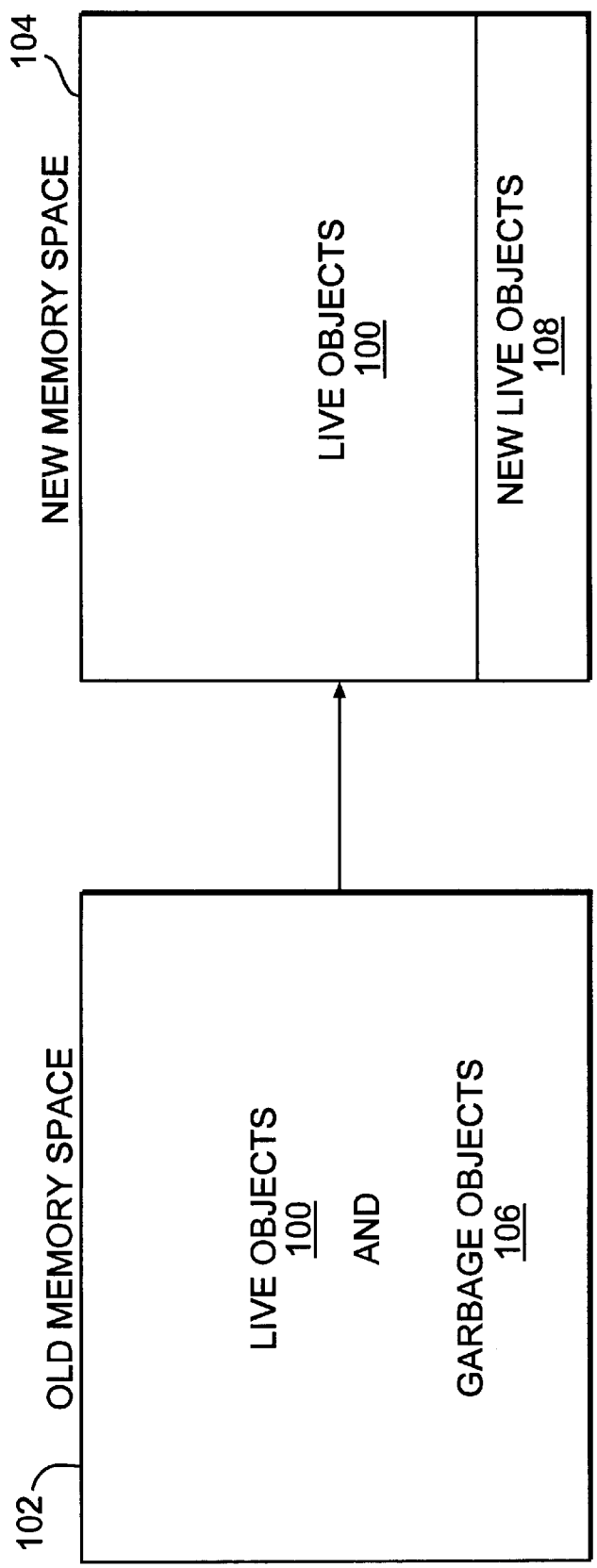
FIG. 1 depicts a conventional copying garbage collection strategy.
Figure 2:
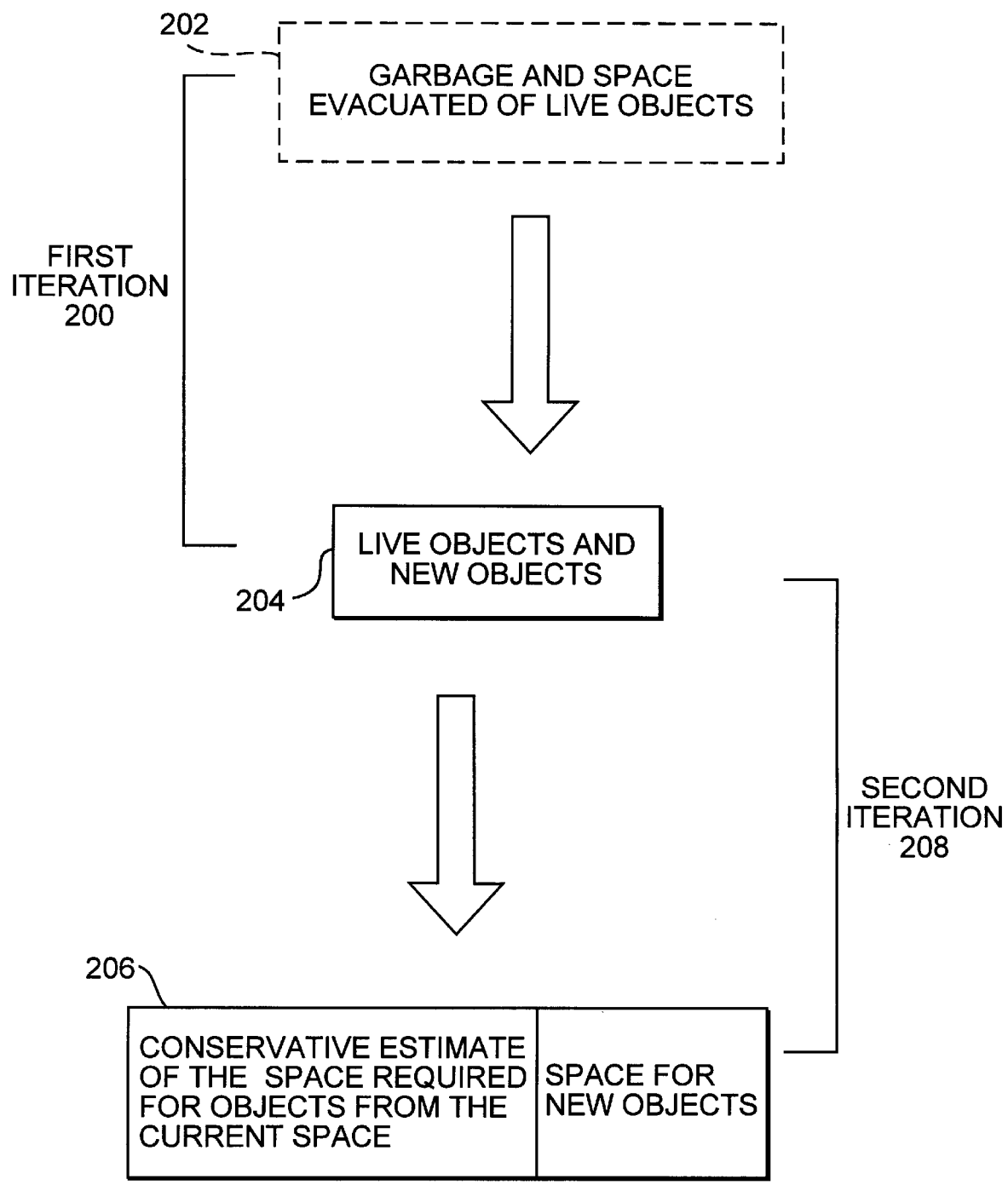
FIG. 2 is a high level diagram of the progression of the memory spaces from one iteration of the process to the next.

When the evacuation of the old memory space is complete, the allocation of new objects in the new memory space halts. At this point, the old memory space is then freed and may be reused since it only contains garbage. Afterward, the process repeats itself. This process is performed repetitively until the procedure has completed. For clarification of the overall process, FIG. 2 further illustrates the progression of the process from one iteration to another. In the first iteration 200, the live objects in memory space 202 are copied to memory space 204 while new objects are allocated to the memory space 204. When the memory space 202 is evacuated of live objects, the memory space 202 can be discarded and the memory reused. At this point, the next iteration of the process, the second iteration 208, begins by allocating a new memory space 206 and copying over only the live objects from the memory space 204 to the new memory space 206. During allocation of the new memory space 206, sufficient space is provided for both the previous objects and the new objects to be allocated by the procedure. This allocation is discussed in greater detail below.

After the second iteration, the heap will have expanded or contracted depending on the amount of garbage in the old memory space 202. During each iteration of the process, if more objects become garbage in the old memory space than expected, the heap will shrink after the next iteration. Similarly, the heap will expand after the next iteration if fewer objects than expected become garbage. The expansion or contraction occurs after the next iteration because, during the current iteration, it cannot be known how many of the objects in FromSpace are live until the objects have been scanned and the live objects copied over.

EXAMPLE

Figure 3:
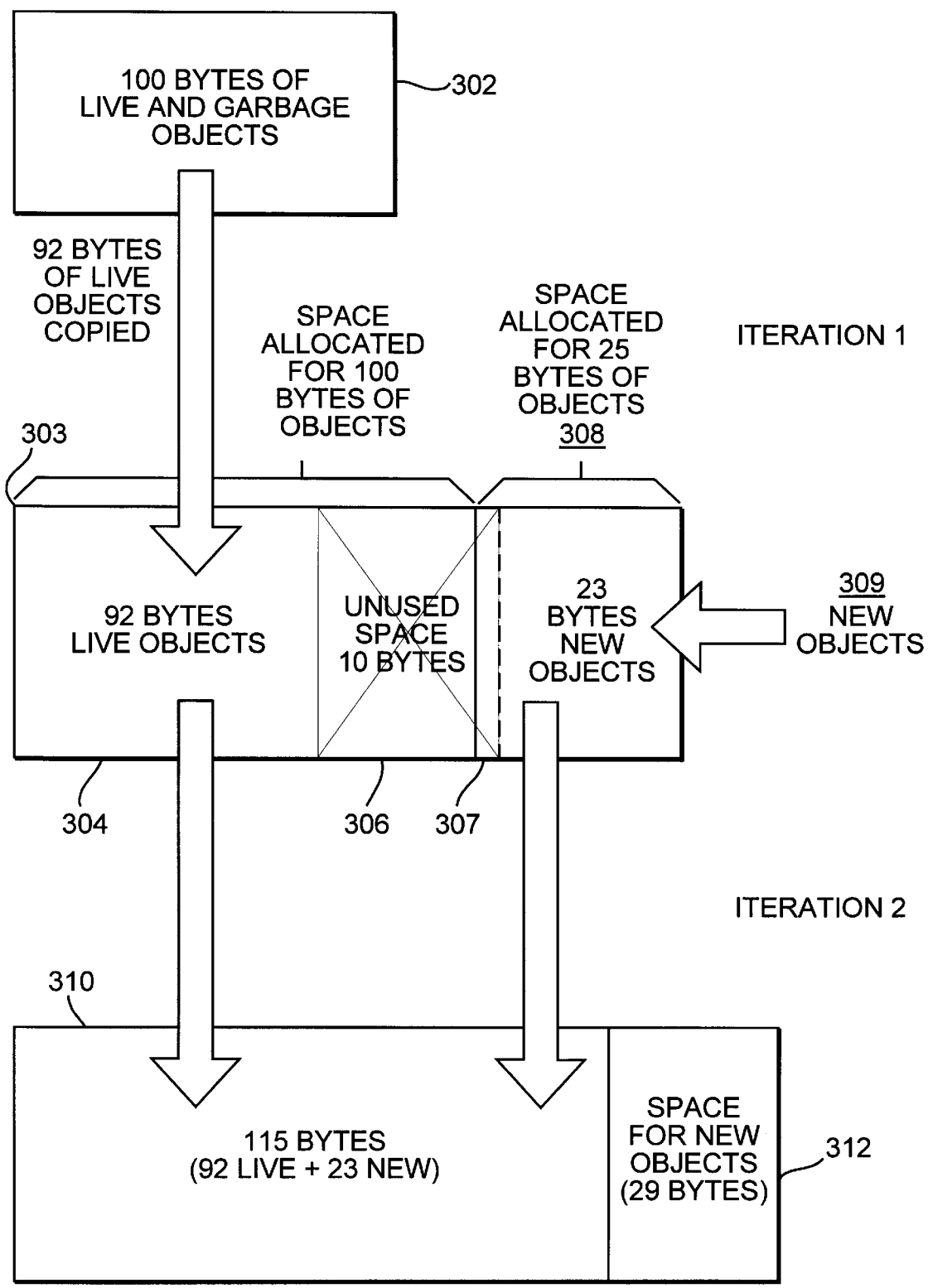
FIG. 3 is a block diagram of a pre-existing space and a newly allocated space used in an example of an embodiment consistent with the present invention.

To more clearly describe the processing of the garbage collector consistent with systems and methods consistent with the present invention, an example is now provided with reference to FIG. 3. For purposes of illustration, only two iterations of the process are shown in FIG. 3. For simplicity, a few arbitrary assumptions are made about the two iterations. First, the FromSpace 302 shown in iteration 1 of the process contains 100 bytes of objects. In this example, 8 bytes of these objects will eventually become garbage, leaving 92 bytes of live objects. Additionally, space for 25 bytes of new objects are reserved in the ToSpace 303 during iteration 1.

To provide a clearer illustration of the expansion of the heap, during the second iteration, no new objects are allocated. Additionally, all objects survive (none become garbage), and all objects are copied into the ToSpace 310 of iteration 2.

As stated, FromSpace 302 contains 100 bytes of live and garbage objects. Initially, a ToSpace 303, shown in iteration 1, is allocated. When allocated, the ToSpace 303 must contain enough space for all surviving objects from the FromSpace 302 and all new objects 309 to be allocated. Since, at this point, it cannot be known by the garbage collector how many objects are live or garbage in the FromSpace 302, the ToSpace 303 must be allocated with enough space to accommodate all of the objects in the FromSpace 302. This space is shown as space 304 and 306 in ToSpace 303 of iteration 1. Additionally, the ToSpace 303 contains an additional space 308 allocated for new objects.

Next, the scanning work is performed, which copies live objects from the FromSpace 302 to the ToSpace 303 and updates pointers to the objects. While the scanning work is performed, the new objects 309 are allocated in proportion to the scanning work. The arrows in FIG. 3 demonstrate the copying of the objects. In this case, the scanning work constant is four because the garbage collector must be able to scan 100 bytes of objects by the time 25 bytes of new objects are allocated. Hence, it must scan four bytes of objects for every one byte of objects 309 allocated. In this example, four bytes of objects in the FromSpace 302 are scanned for every new byte 309 allocated into the ToSpace 303, and consequently, by the time that the 92 bytes of live objects are scanned, 23 bytes of new objects 309 are allocated. Although a space 308 for 25 bytes of objects is allocated to accommodate new objects 309, only 23 new objects in this example are actually allocated. This results from the fact that since 92 live objects are scanned and 4 objects are scanned for every new byte allocated, only 23 new bytes will be allocated by the time the 92 bytes of live objects are scanned. If all 100 bytes of objects in the FromSpace 302 had survived, 25 bytes of new obejcts would have been allocated and would have filled the space 308 allocated for new objects. However, in this case, the garbage collector begins a new iteration immediately after the completion of the relocation of the 92 live objects.

In accordance with the assumption that 8 of the 100 bytes of objects in FromSpace 302 became garbage, 92 bytes of live objects are copied into the ToSpace 303. Since a space (304 and 306) was allocated in ToSpace 303 for 100 bytes of objects and only 92 live objects were copied over, an unused space 306, large enough for 8 bytes of objects remains. Additionally, since only 23 bytes of new objects were allocated to the space 308 allocated for 25 new bytes of objects, an unused space 307 large enough for two bytes of object remains. As a result, the total unused space 306 and 307 is large enough for 10 bytes of objects. Hence, the ToSpace 303 holds a total of 115 bytes of objects but has space for 125 bytes of objects due to the unused space 306 and 307.

When the second iteration begins, the ToSpace 303 is renamed FromSpace 303. Then, a new ToSpace 310 is allocated to be large enough to hold all of the objects in the FromSpace 303 plus space for new objects to be allocated. Here, the ToSpace 310 is allocated to be large enough to hold all of the objects (115 bytes) from the FromSpace 303 and 29 bytes reserved for new objects to be allocated (space 312). During iteration 2, all of the objects in the FromSpace 303 survive (i.e., none become garbage) and no new objects are allocated (0 new objects are put into the space 312 in ToSpace 310). Given these assumptions, all 115 bytes of objects in the FromSpace 303, are scanned, and since they are all live, all of them are copied over to the new ToSpace 310.

As a result, from the beginning of iteration 1 to the end of iteration 2, it can be seen that the heap grew from 100 bytes to 144 bytes. This is due to the fact that, in this example, 8 bytes of objects became garbage, and 23 bytes of new objects were allocated, thus making the heap grow by the difference, 15 bytes and 29 bytes reserved for new objects. It can also be seen that, since during iteration 1, it is not known how many objects have become garbage objects in FromSpace 302, it cannot be determined exactly how much the heap will grown or shrunk until the second iteration.

It should also be noted that the allocation of the space for 25 bytes of new objects in this example is arbitrary. If more new objects 309 were to be allocated, more space 308 would have been allocated to accommodate the increased amount of objects, and the scanning work ratio would have reduced. Finally, it should be noted that, on the second iteration of this example, the assumption that no objects died and no new objects were allocated is made and shown for example only. Generally, objects die and new objects are allocated on each iteration.

Implementation Details

Figure 4:
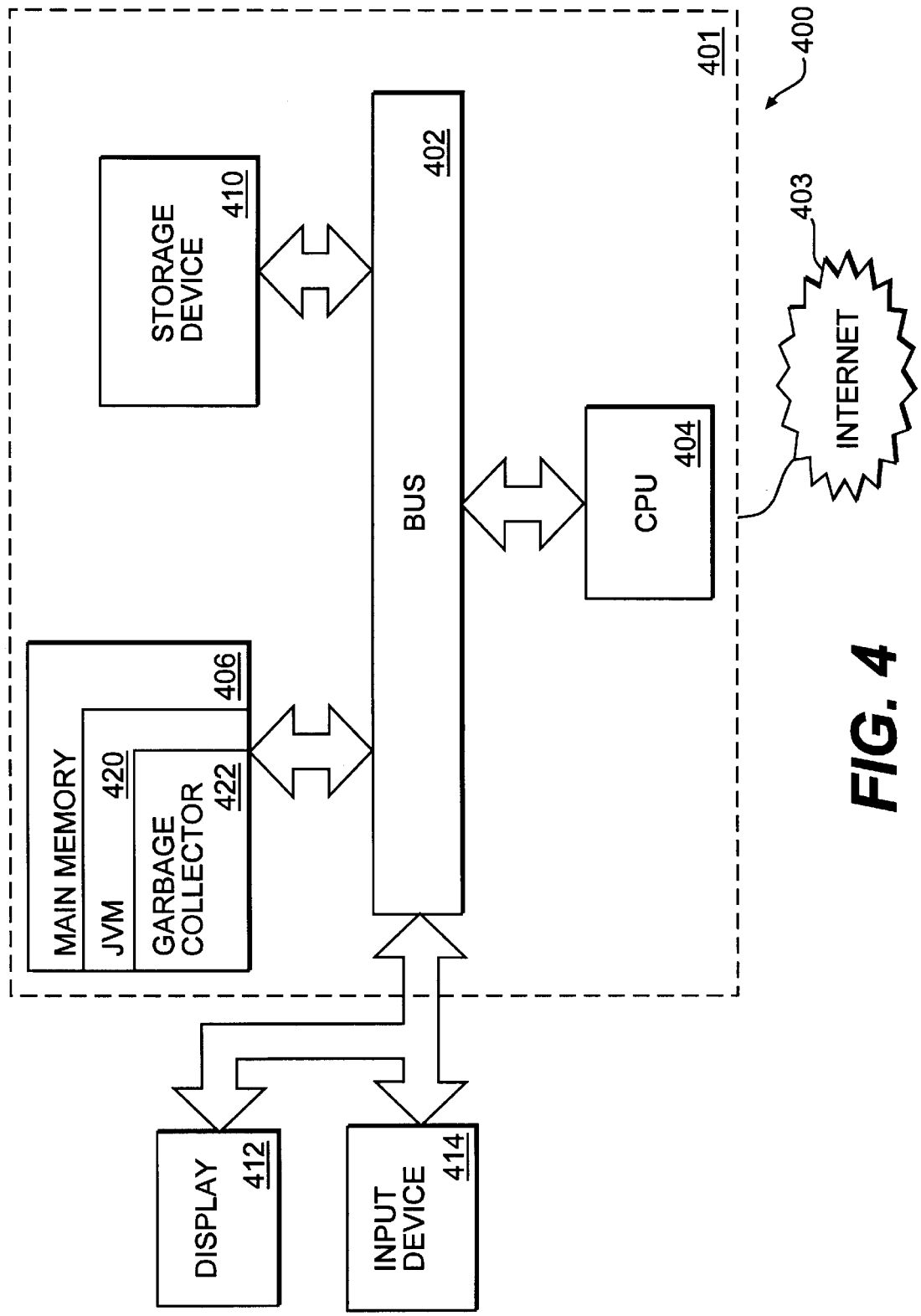
FIG. 4 is a block diagram of a computer architecture suitable for use with the present invention.

FIG. 4 is a block diagram of a data processing system 400 suitable for use with systems consistent with the present invention. The data processing system 400 comprises a computer system 401 connected to the Internet 403. Computer system 401 includes a central processing unit (CPU) 404, a main memory 406, and a secondary storage device 410 interconnected via bus 402. Additionally, the computer system 400 includes a display 412, and an input device 414. The main memory 406 contains a Java™ Virtual Machine 420 and the garbage collector 422 of the exemplary embodiment. One skilled in the art will appreciate that the garbage collector consistent with the present invention may be stored in other computer readable media besides memory like secondary storage devices, such as hard disks, floppy disks, and CD ROM, or a carrier wave from the Internet 403. The Java™ Virtual Machine 420 is a well-known execution vehicle for computer programs and is described in greater detail in Lindholm and Yellin, *The Java Virtual Machine Specification,* Addison-Wesley, 1996, which is hereby incorporated by reference. Although the garbage collector 422 is described as operating in a Java™ Virtual Machine, one skilled in the art will appreciate that the garbage collector may operate in other programs, like operating systems, and may operate in other object-oriented or non-object oriented programming environments. Additionally, one skilled in the art will also appreciate that computer system 400 may contain additional or different components.

Incremental Heap Expansion in a Real-Time Garbage Collector

Figure 5:
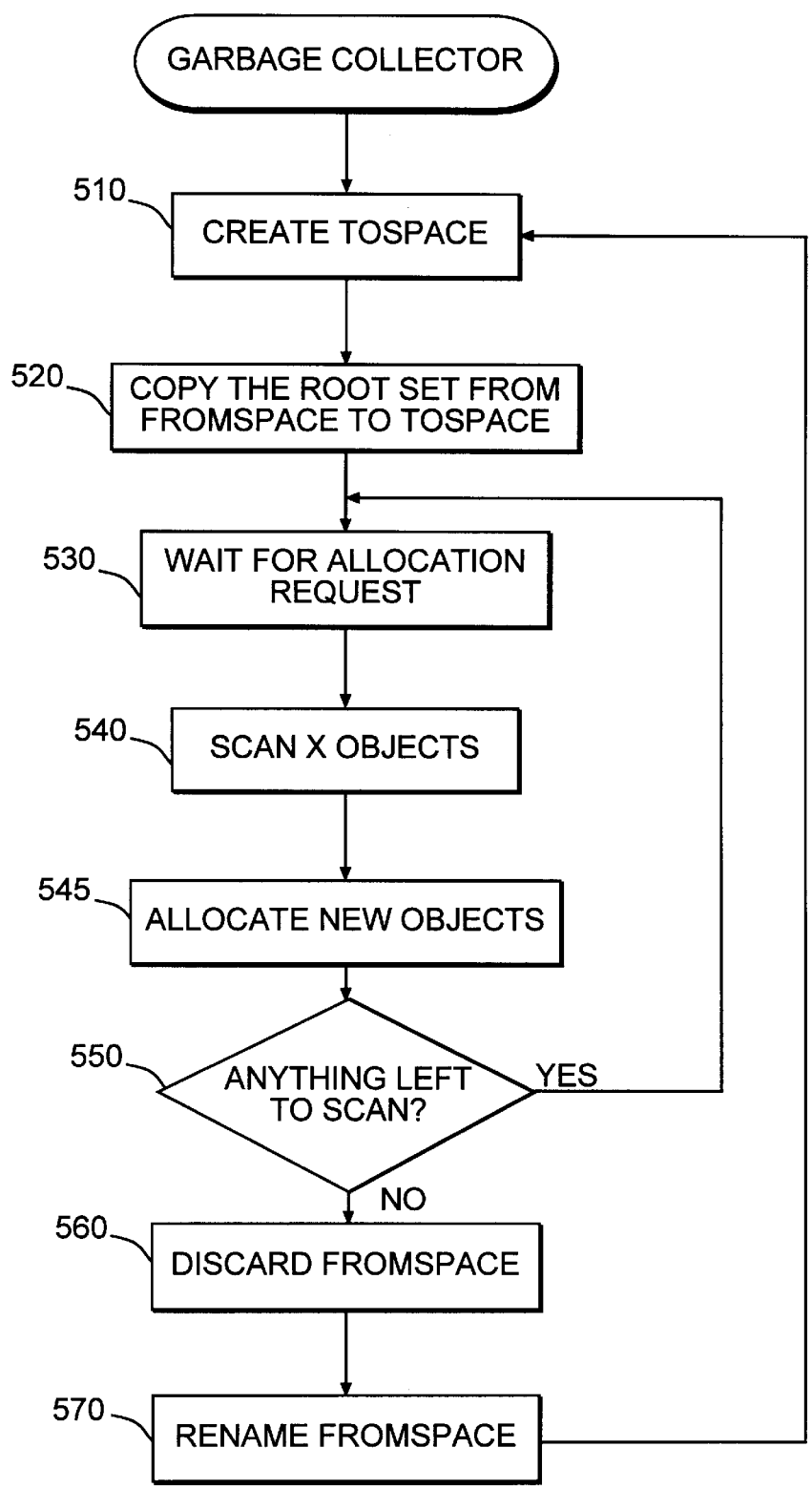
FIG. 5 is a flowchart of the steps used by systems consistent with the present invention.

To describe the steps performed by the garbage collector 422, please consider FIG. 5, a flowchart illustrating the steps performed by the garbage collector consistent with the present invention. When the garbage collector first begins processing for a procedure, the procedure already has allocated a FromSpace (the FromSpace 610 depicted in FIG. 6) containing the objects that are used during its lifetime, including both live objects 612 and garbage objects 614. The size of this FromSpace is predetermined (e.g., 10K). Eventually, this FromSpace fills up, necessitating garbage collection. When the FromSpace fills, the JVM 420 invokes the garbage collector 422. The first step performed by the garbage collector 422 is to create a ToSpace for storing the live objects from the FromSpace (step 510). To create the ToSpace, the garbage collector makes a conservative estimate of the maximum space that can be occupied by the live objects 612 coming from the FromSpace 610. This conservative estimate is at least as large as the space occupied by all of the objects (live 612 and garbage 614) in FromSpace 610 since it cannot be known until the scanning is complete how many, if any, of the objects in the FromSpace have died and become garbage. For this reason, it will not be known how much the heap has shrunk or grown until the next iteration is complete.

Figure 6:
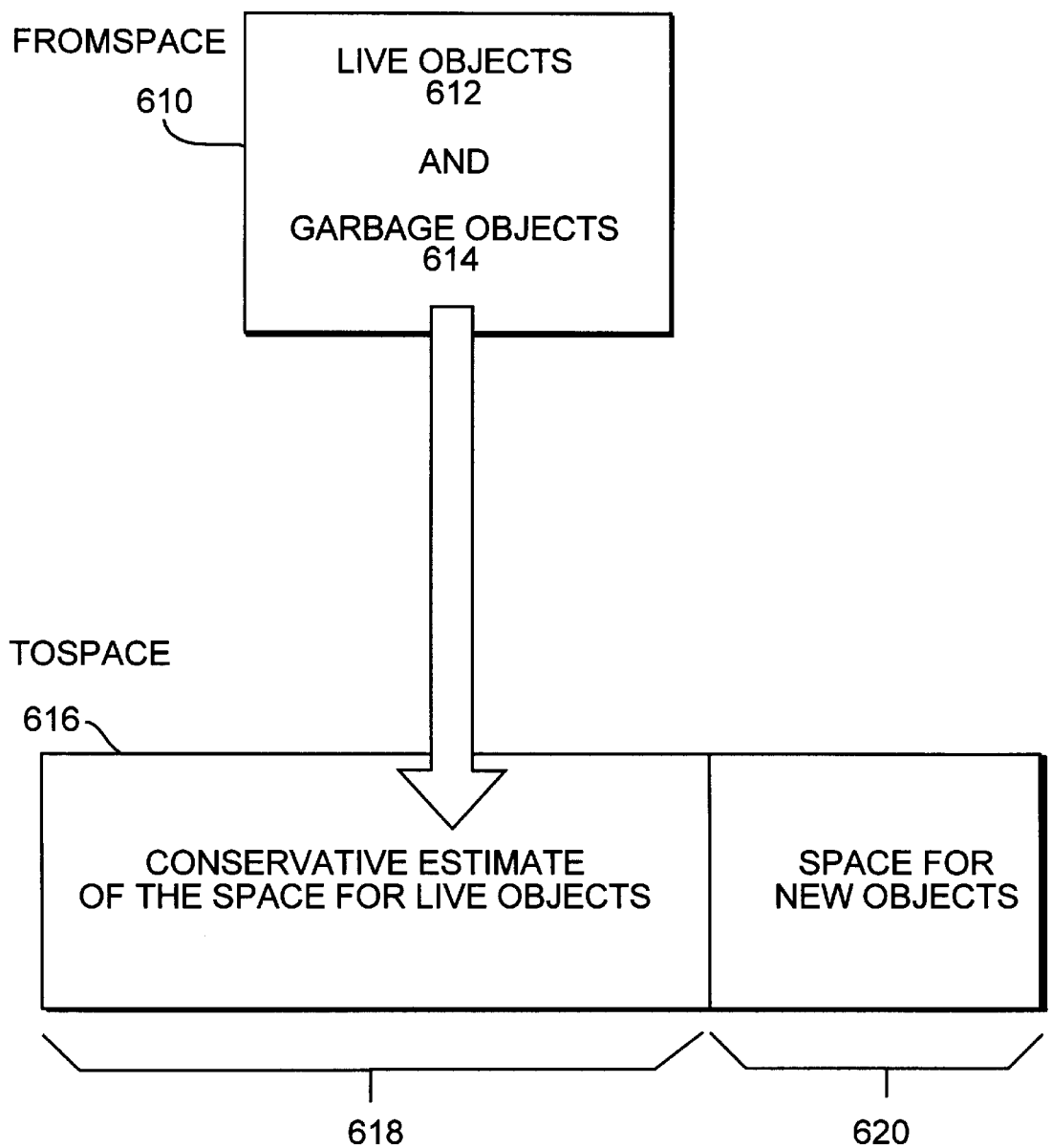
FIG. 6 is a block diagram of a pre-existing space and a newly allocated space.

The total space allocated to the ToSpace 616 in FIG. 6 includes the conservative estimate 618 of the space occupied by the pre-existing objects in the FromSpace 610 plus additional space for new objects 620. The additional space allocated for the new objects 620 is configured as discussed below, but the total ToSpace 616 should be at least as large as the objects 612 and 614 from the FromSpace 610.

The garbage collector 422 then copies the root set from FromSpace to ToSpace (step 520). After the copying of the root set, the garbage collector 422 begins the scanning and allocation work as reflected by steps 530–560. As part of the scanning and allocation work, the garbage collector determines if a new object is being allocated (step 530), and if so, it scans a predefined number of objects (step 540) and allocates the new objects (step 545). The garbage collector 422 performs the scanning work in proportion to the conservative estimate for the space occupied by the pre-existing objects in FromSpace 618 and the space allocated to new objects 620. Because objects may be of differing size, the garbage collector describes the proportion in terms of bytes of objects and not the number of objects. The ratio of the bytes of live objects scanned to the bytes of new objects allocated in ToSpace is the same as the ratio of the space of the conservative estimate of the space occupied by the objects 618 in FromSpace to the space allocated for new objects 620.

$$\text{Scanning Work} = \frac{\text{Bytes of live objects scanned}}{\text{New bytes allocated}} = \frac{\text{Conservative estimate of object space 618}}{\text{Space allocated for new objects 620}}$$

As the proportion shows, for every byte newly allocated to ToSpace, a certain number of bytes are scanned in FromSpace. This ratio is the same as the size of the pre-existing object space 618 divided by the size of the space for new allocations 620. If the scanning work is done in this proportion, the garbage collector guarantees the transfer all live objects from FromSpace before ToSpace runs out of room. Because of this guarantee, the process can continue to iterate indefinitely.

The formula involves two configurable variables, space allocated for new objects and the scanning work done. It should be noted that, while either variable can be chosen to be configured, only one of the variables in the formula is independent, i.e., when one is chosen, the other variable is automatically determined. The garbage collector can configure one or the other. Because work and space are inversely related, the more scanning work performed by the garbage collector, the less space is required to accommodate new allocations. Conversely, the garbage collector can allocate more space for new objects 620 if less work is performed.

When FromSpace is evacuated (step 550) and all live objects have been relocated, allocation of new objects should be stopped in ToSpace. FromSpace can then be discarded (step 560) and is now available space because it only contains garbage. When ToSpace has stopped allocation and FromSpace is evacuated and discarded, the process can begin again, and as such, processing continues to step 510. The process repeats by identifying the ToSpace as FromSpace, allocating a new ToSpace (step 570), and copying the root set.

Conclusion

Systems and methods consistent with the present invention expand and contract the heap while maintaining real-time behavior. These systems and methods also specify, through the time and space proportion, the amount the heap can be expanded and contracted, thereby maximizing the efficiency of the use of the memory space. Further, it can also be parameterized to trade available space and time overhead while maintaining its real-time properties.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. The scope of the invention is defined by the claims and their equivalents.

What is claimed is:

1. An incremental garbage collection method performed in a data processing system having memory spaces, a first of the memory spaces containing reachable and unreachable objects, the method comprising the steps of:
   determining a size for a second of the memory spaces, the size being large enough to store the objects from the first of the memory spaces and new objects to be allocated;

allocating the second memory space such that the size of the second memory space is the determined size; and simultaneously copying the reachable objects from the first memory space into the second memory space leaving the unreachable objects in the first memory space and allocating new objects in the second memory space.

2. The method of claim 1, further including the step of:

discarding the first memory space after the copying step.

3. The method of claim 1, wherein the allocating step allocates the size of the second memory space to be different from the size of the first memory space.

4. The method of claim 1, wherein the copying step includes allocating the new objects in proportion to the objects copied from the first memory space.

5. The method of claim 1, wherein the copying step includes allocating the new objects in proportion to the size of the objects copied from the first memory space.

6. The method of claim 1, wherein the copying step further includes the step of:

stopping the allocation of new objects into the second memory space when all reachable objects are copied from the first memory space into the second memory space.

7. The method of claim 6, wherein the stopping step further includes:

repeating the method to perform another iteration of garbage collection.

8. An apparatus for performing incremental garbage collection in a data processing system having memory spaces, a first of the memory spaces containing reachable and unreachable objects the apparatus comprising:

a determination component configured to determine a size for a second of the memory spaces, the size being large enough to store the objects from the first of the memory spaces, and new objects to be allocated;

an allocation component configured to allocate the second memory space so that the size of the second memory space is the determined size; and a copying component configured to simultaneously copy the reachable objects from the first memory space into the second memory space leaving the unreachable objects in the first memory space and allocate new objects in the second memory space.

9. The apparatus of claim 8, further comprising:

a discarding component configured to discard the first memory space after the reachable objects have been copied.

10. The apparatus of claim 8, wherein the allocation component is configured to allocate the size of the second memory space to be different from the size of the first memory space.

11. The apparatus of claim 8, wherein the copying component is configured to copy the reachable objects from the first memory space to the second memory space in proportion to the new objects.

12. The apparatus of claim 8, wherein the copying component includes:

a stopping component configured to stop the allocation of new objects into the second memory space when all reachable objects are copied from the first memory space into the second memory space.

13. A data processing system comprising:

a memory further including:

a computer program with an executing procedure for allocating reachable objects on a heap portion of the memory, wherein a plurality of the reachable objects become unreachable during the execution of the procedure; and an incremental garbage collector that iteratively performs garbage collection on the unreachable objects while allocating new objects and that dynamically resizes the heap portion of the memory during iterations of the garbage collection of the unreachable objects; and a processor for running the computer program and the garbage collector.

14. The data processing system of claim 13, wherein the garbage collector is part of a virtual machine.

15. The data processing system of claim 14, wherein the computer program fills the heap portion of the memory with the reachable objects and the unreachable objects; and wherein the garbage collector copies the reachable objects to a new heap portion of the memory responsive to the heap portion of the memory filling.

16. A method for performing incremental garbage collection in a data processing system having a procedure, a garbage collector, and memory spaces, a first of the memory spaces containing reachable and unreachable objects, the method comprising the steps of:

starting execution of the procedure;

determining a size for a second of the memory spaces by the garbage collector, the size being large enough to store the objects from the first of the memory spaces and new objects to be allocated;

allocating the second memory space by the garbage collector such that the size of the second memory space is the determined size;

copying by the garbage collector a root set from the first memory space into the second memory space, the root set capable of accessing the reachable objects.

allocating new objects into the second memory space, and while each new object is allocated, copying by the garbage collector a predesignated portion of the reachable objects into the second memory space and leaving the unreachable objects in the first memory space until the reachable objects have been copied into the second memory space;

discarding the first memory space by the garbage collector; and repetitively performing the foregoing steps until the procedure stops execution.

17. A computer-readable medium containing instructions for controlling a data processing system to perform an incremental garbage collection method, the data processing system having memory spaces, the method comprising the steps of:

determining a size for a second of the memory spaces, the size being large enough to store the objects from the first of the memory spaces and new objects to be allocated;

allocating the second memory space such that the size of the second memory space is the determined size; and simultaneously copying the reachable objects from the first memory space into the second memory space leaving the unreachable objects in the first memory space and allocating new objects in the second memory space.

18. The computer readable medium of claim 17, wherein the method further includes the step of:

discarding the first memory space after the copying step.

19. The computer readable medium of claim 17, wherein the allocating step allocates the size of the second memory space to be different from the size of the first memory space.

20. The computer readable medium of claim 17, wherein the copying step includes allocating the new objects in proportion to the objects copied from the first memory space to the second memory space.

21. The computer readable medium of claim 17, wherein the copying step includes allocating the new objects in proportion to the size of the reachable objects copied from the first memory space to the second memory space.

22. The computer readable medium of claim 17, wherein the copying step includes the step of:

stopping the allocation of new objects into the second memory space when all reachable objects are copied from the first memory space into the second memory space.

23. The computer readable medium of claim 22, wherein, the stopping step further includes the step of:

repeating the method to perform another iteration of garbage collection.

24. An apparatus for performing incremental garbage collection in a data processing system having memory spaces, a first of the memory spaces containing reachable and unreachable objects, the apparatus comprising:

a means for determining a size for a second of the memory spaces, the size being large enough to store the objects from the first of the memory spaces, and new objects to be allocated;

a means for allocating the second memory space so that the size of the second memory space is the determined size; and a means for simultaneously copying the reachable objects from the first memory space into the second memory space leaving the unreachable objects in the first memory space and allocating new objects into the second memory space.

* * * * *

UNITED STATES PATENT AND TRADEMARK OFFICE
CERTIFICATE OF CORRECTION

PATENT NO. : 6,286,016 B1  
DATED : September 4, 2001  
INVENTOR(S) : Steve Heller et al.

Page 1 of 1

It is certified that error appears in the above-identified patent and that said Letters Patent is hereby corrected as shown below:

<u>Column 9, claim 8,</u>  
Line 32, after "unreachable objects", insert a comma.

Signed and Sealed this

Twelfth Day of March, 2002

Attest:

Attesting Officer

JAMES E. ROGAN  
*Director of the United States Patent and Trademark Office*